United States Patent
Wang et al.

(10) Patent No.: US 11,380,061 B2
(45) Date of Patent: Jul. 5, 2022

(54) METHOD AND APPARATUS FOR THREE-DIMENSIONAL (3D) OBJECT AND SURFACE RECONSTRUCTION

(71) Applicant: SAMSUNG ELECTRONICS CO., LTD., Suwon-si (KR)

(72) Inventors: Ziyun Wang, Philadelphia, PA (US); Eric Anthony Mitchell, Stanford, CA (US); Ibrahim Volkan Isler, Saint Paul, MN (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/177,896

(22) Filed: Feb. 17, 2021

(65) Prior Publication Data

US 2021/0390776 A1 Dec. 16, 2021

Related U.S. Application Data

(60) Provisional application No. 63/037,785, filed on Jun. 11, 2020.

(51) Int. Cl.
*G06T 17/20* (2006.01)
*H04L 67/10* (2022.01)
(Continued)

(52) U.S. Cl.
CPC .......... *G06T 17/20* (2013.01); *G06N 3/0454* (2013.01); *G06N 3/08* (2013.01); *H04L 67/10* (2013.01)

(58) Field of Classification Search
CPC ......... G06T 17/20; H04L 67/10; H04L 29/08; G06N 3/0454; G06N 3/08; G06N 3/04
See application file for complete search history.

(56) References Cited

U.S. PATENT DOCUMENTS

2019/0026917 A1 1/2019 Liao et al.
2019/0026956 A1* 1/2019 Gausebeck ............. G06T 7/521
(Continued)

OTHER PUBLICATIONS

Guo, Haiyun et al, ("Multi-view 3D object retrieval with deep embedding network." IEEE Transactions on Image Processing (vol. 25, Issue: 12, Dec. 2016) pp. 5526-5537; https://ieeexplore.ieee.org/document/7569026.*
(Continued)

*Primary Examiner* — Xilin Guo
(74) *Attorney, Agent, or Firm* — Sughrue Mion, PLLC (57) ABSTRACT

An apparatus for reconstructing a 3D object, includes a memory storing instructions, and at least one processor configured to execute the instructions to obtain, using a first neural network, mapping function weights of a mapping function of a second neural network, based on an image feature vector corresponding to a 2D image of the 3D object, set the mapping function of the second neural network, using the obtained mapping function weights, and based on sampled points of a canonical sampling domain, obtain, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector.

20 Claims, 9 Drawing Sheets

(51) Int. Cl.
*G06N 3/04* (2006.01)
*G06N 3/08* (2006.01)

(56) References Cited

U.S. PATENT DOCUMENTS

2021/0287430 A1* 9/2021 Li .............................. G06T 7/74
2021/0312698 A1* 10/2021 He ......................... G06V 10/40

OTHER PUBLICATIONS

Mitchell, Eric et al., "Higher-Order Function Networks for Learning Composable 3D Object Representations", Published as a conference paper at ICLR 2020, arXiv:1907.10388v2, [cs.LG], Apr. 6, 2020. (19 pages total).

* cited by examiner

2D Input Image

Mesh Reconstruction

FIG. 6A

Chart Visualization

METHOD AND APPARATUS FOR THREE-DIMENSIONAL (3D) OBJECT AND SURFACE RECONSTRUCTION

CROSS-REFERENCE TO RELATED APPLICATION

This application claims priority under 35 U.S.C. § 119 from U.S. Provisional Application No. 63/037,785 filed on Jun. 11, 2020, in the U.S. Patent & Trademark Office, the disclosure of which is incorporated herein by reference in its entirety.

FIELD

Methods and apparatuses consistent with embodiments relate to 3D object and surface reconstruction.

BACKGROUND

Single-view 3D object reconstruction is a challenging fundamental problem in computer vision, largely due to the morphological diversity of objects in the natural world. While deep learning has enabled automated learning of 3D reconstructions from data, state of the art approaches still fail to accurately capture the underlying manifold structures of even simple objects. In particular, experiments show that high curvature is not captured effectively by methods trained only with set-based loss functions such as Chamfer loss, resulting in reconstructions that contain problematic simplifications.

SUMMARY

Embodiments provide a method and an apparatus for 3D object and surface reconstruction.

According to an aspect of the disclosure, there is provided an apparatus for reconstructing a three-dimensional (3D) object, the apparatus including a memory storing instructions, and at least one processor configured to execute the instructions to obtain, using a first neural network, mapping function weights of a mapping function of a second neural network, based on an image feature vector corresponding to a two-dimensional (2D) image of the 3D object, set the mapping function of the second neural network, using the obtained mapping function weights, and based on sampled points of a canonical sampling domain, obtain, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector.

The at least one processor may be further configured to execute the instructions to obtain a geodesic distance between two of the obtained 3D point coordinates and the obtained geodesic lifting coordinates of each of the sampled points.

The 3D samples may be of a surface or an interior of the canonical sampling domain, and the canonical sampling domain may be a unit sphere or a unit cube.

The 3D point coordinates may correspond to a surface or an interior of the 3D object included in the 2D image.

The first neural network may be trained to obtain the mapping function weights, based on the image feature vector, in connection with the second neural network that is trained to obtain the 3D point coordinates the geodesic lifting coordinates, based on the sampled points.

The apparatus may be a client device including the second neural network, and the first neural network may be included in a server device external to the client device.

The at least one processor may be further configured to obtain the image feature vector corresponding to the 2D image, using a third neural network.

The at least processor may be further configured to sample the canonical sampling domain to obtain the sampled points.

According to an aspect of the disclosure, there is provided a method of reconstructing a three-dimensional (3D) object, the method including obtaining, using a first neural network, mapping function weights of a mapping function of a second neural network, based on an image feature vector corresponding to a two-dimensional (2D) image of the 3D object, setting the mapping function of the second neural network, using the obtained mapping function weights, and based on sampled points of a canonical sampling domain, obtaining, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector.

The method may further include obtaining a geodesic distance between two of the obtained 3D point coordinates and the obtained geodesic lifting coordinates of each of the sampled points.

The 3D samples may be of a surface or an interior of the canonical sampling domain, and the canonical sampling domain may be a unit sphere or a unit cube.

The 3D point coordinates may correspond to a surface or an interior of the 3D object included in the 2D image.

The first neural network may be trained to obtain the mapping function weights, based on the image feature vector, in connection with the second neural network that is trained to obtain the 3D point coordinates the geodesic lifting coordinates, based on the sampled points.

The method may be performed by a client device including the second neural network, and the first neural network may be included in a server device external to the client device.

The method may further include obtaining the image feature vector corresponding to the 2D image, using a third neural network.

The method may further include sampling the canonical sampling domain to obtain the sampled points.

According to embodiments, a non-transitory computer-readable storage medium may store instructions that, when executed by at least one processor, cause the at least one processor to perform the method.

According to embodiments, there is provided a training method for reconstructing a three-dimensional (3D) object, the training method including obtaining, using a first neural network, mapping function weights of a mapping function of a second neural network, based on an image feature vector corresponding to a two-dimensional (2D) image of the 3D object, setting the mapping function of the second neural network, using the obtained mapping function weights, based on sampled points of a canonical sampling domain, obtaining, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector, obtaining a first loss that is a first distance between the 3D point coordinates of a respective one of the sampled points and original point coordinates of the respective one of the sampled points, and updating parameters of the first neural network and the second neural network to minimize the obtained first loss.

The training method may further include obtaining a first geodesic distance between two of the obtained 3D point coordinates and the obtained geodesic lifting coordinates of each of the sampled points, and obtaining a second loss that is a second distance between the first geodesic distance and a second geodesic distance between two of the sampled points corresponding to the two of the obtained 3D point coordinates and the obtained geodesic lifting coordinates of each of the sampled points. The updating may include updating the parameters of the first neural network and the second neural network to minimize the obtained first loss and the obtained second loss.

A non-transitory computer-readable storage medium may store instructions that, when executed by at least one processor, cause the at least one processor to perform the training method.

While the afore-described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

The above and other aspects and features of embodiments of the disclosure will be more apparent from the following description taken in conjunction with the accompanying drawings, in which.

DETAILED DESCRIPTION

Embodiments of the present disclosure provide a method and an apparatus for 3D object and surface reconstruction.

Reconstructing the 3D model of an object from a single image is a central problem in computer vision, with many applications. For example, in computer graphics, surface models such as triangle meshes are used for computing object appearance. In robotics, surface normal vectors are used for grasp planning, and in computer aided design and manufacturing, complete object models are needed for production. Motivated by such use cases, recent deep learning based approaches to 3D reconstruction have shown exciting progress by using powerful function approximators to represent a mapping from the space of images to the space of 3D geometries. It has been shown that deep learning architectures, once trained on large datasets, are capable of outputting accurate object models in various representations including discrete voxelizations, unordered point sets, or implicit functions.

These representations can generally produce aesthetically pleasing reconstructions, but extracting topological information from them, such as computing neighborhoods of a point on the surface, can be difficult. In particular, naively computing a neighborhood of a point using a Euclidean ball or Euclidean nearest neighbors can give incorrect results if the object has regions of high curvature. Such mistakes can in turn degrade performance on downstream tasks such as unsupervised part detection or surface normal estimation.

In order to produce high-quality reconstructions while accurately representing the topology of the object surface, embodiments present a method for reconstructing a continuous surface representation of an object from a single image. First, in order to enable high resolution sampling on a surface, we represent an object O as a set of points produced by applying a mapping function f to a set of input points sampled from the unit sphere. The mapping function f embeds its inputs into a space that encodes information about the geometry of the object. Existing methods use the mapping function f to simply map input points directly onto the surface of the object in R3, a 3D object space, to produce a reconstruction. In an embodiment, the mapping function f maps input points to Rd, d>3, such that Euclidean distance between two points after the mapping corresponds to their geodesic distance on the object surface. This mapping function f is constrained such that the first three dimensions (i.e., the point coordinates) can be interpreted directly as samples from the object surface. The mapping function f is represented as a neural network whose weights are computed from an input RGB image by a second, "higher order" function (HOF). This will be referenced as an architecture Geodesic-HOF in the rest of the disclosure, and by learning geodesic distances, the Geodesic-HOF learns surface features such as curvature that are not always captured by existing methods.

The learned representation using Geodesic-HOF can be used for meaningful object decompositions into non-overlapping charts that can be used for generating triangulations or explicit function representations of surfaces.

A substantial body of work exists at the intersection of differential geometry, computer vision, and deep learning that studies the usefulness of geodesics in many 3D settings, such as surface matching, shape classification, and manifold learning.

Figure 1A:
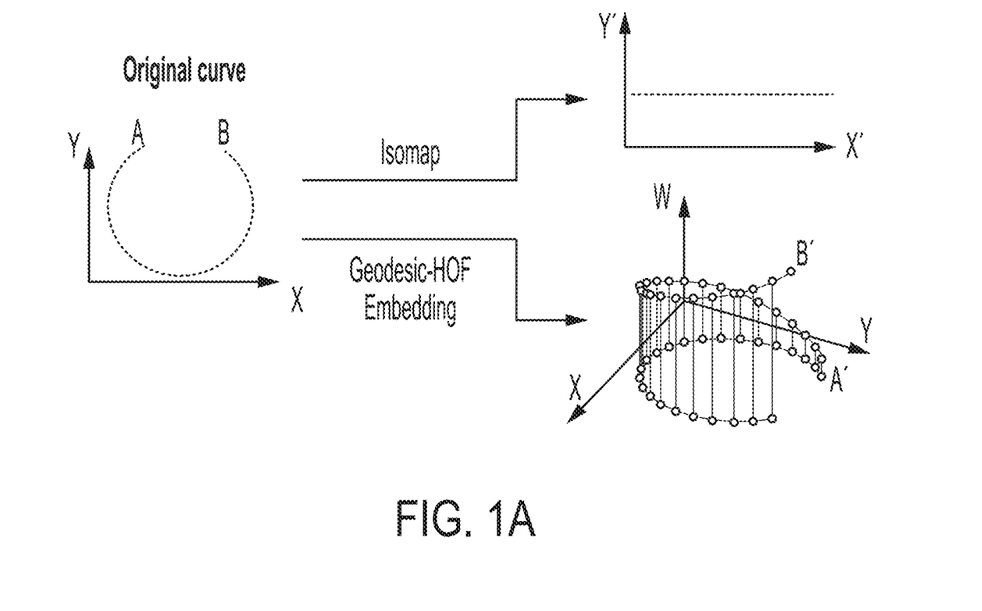
FIGS. 1A and 1B are diagrams of embedding a cut circle with ISOMAP and Geodesic-HOF according to embodiments, and face decomposition using geodesic lifting coordinates according to embodiments.
Figure 1B:
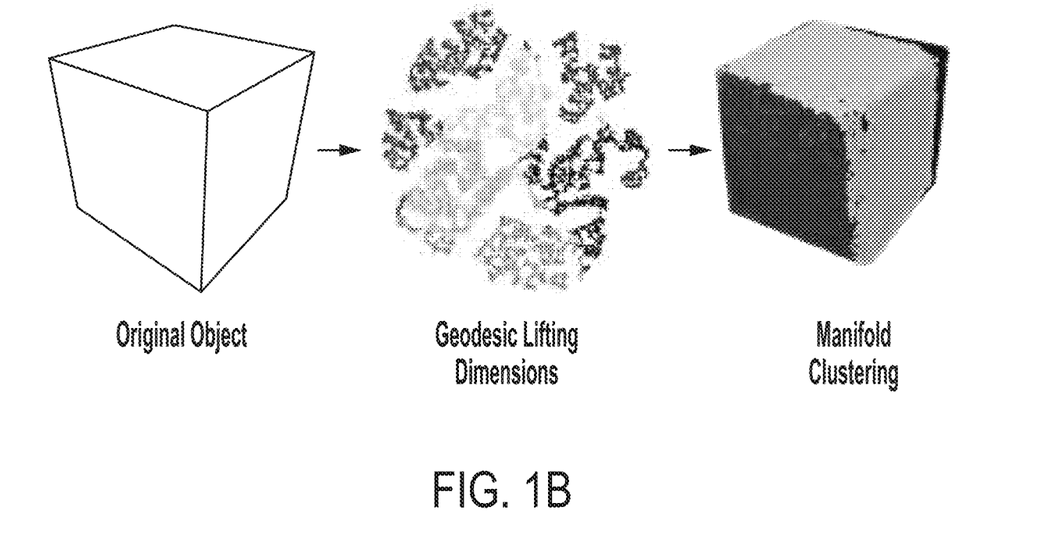

FIGS. 1A and 1B are diagrams of embedding a cut circle with ISOMAP and Geodesic-HOF according to embodiments, and face decomposition using geodesic lifting coordinates according to embodiments.

As shown in FIG. 1A, in contrast to embedding methods such as ISOMAP, Geodesic-HOF preserves original Euclidean coordinates and lift points to a higher-dimensional space by adding extra "geodesic lifting coordinates."

As shown in FIG. 1B, direct embedding of geodesic distances does not necessarily yield the object surface. In Geodesic-HOF the network is designed to explicitly output a sampling of the surface manifold and learn geodesic distances.

In an embodiment, an image-conditioned mapping function is learnt from a canonical sampling domain to a high dimensional space where the Euclidean distance is equal to the geodesic distance on the object. The canonical sampling domain is a domain that is warped onto the object.

Experiments show that taking advantage of these learned geodesics yields better performance than using point cloud reconstructions alone for estimating surface normals and generating surfaces. Further, the learned geodesic embedding space provides useful information for applications such as unsupervised object decomposition.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, each element described hereinafter may additionally perform some or all of functions performed by another element, in addition to main functions of itself, and some of the main functions of each element may be performed entirely by another component.

In the present specification, an 'image' may denote a still image, a moving image including a plurality of consecutive still images (or frames), or a video. The image may be a two-dimensional (2D) image or a three-dimensional (3D) image.

Further, in the present specification, a neural network is a representative example of an artificial intelligence model, but embodiments are not limited to an artificial intelligence model using an algorithm.

Furthermore, in the present specification, a 'parameter' or a 'neural network parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

For many applications of 3D reconstruction, the desired output is a triangular mesh. However, for point set-based reconstruction methods, this objective is problematic because of the need to determine the connectivity of points in the model's output for the purpose of creating the mesh. From a finite set of points, connecting points based on Euclidean distance proximity alone is insufficient to produce an accurate depiction of the surface topology. If distant points on the manifold are erroneously considered to be close because they are close in the Euclidean space used for computing neighborhoods, the so-called "short-circuiting" problem arises.

A geodesic between two points on a surface is a shortest path between these points that lies entirely on the surface. Geodesics carry a significant amount of information about surface properties. In particular, the difference between the geodesic and Euclidean distances between two points is directly related to curvature. Intuitively, connecting points based on geodesic distance, rather than Euclidean distance yields a more faithful reconstruction of the true surface. Given this setup, the surface reconstruction problem can be formalized.

Problem statement: given a single image I of an object O, the goal is to be able to (i) generate an arbitrary number of samples from the surface of O, and (ii) compute the geodesic distance between any two generated points on the surface. An embodiment uses Chamfer distance (Equation (1) below) to quantify the similarity between a set of samples from the model and the ground truth O.

Geodesic-HOF is a neural network architecture and set of training objectives that aim to address the problem presented above. In order to describe the technical details of Geodesic-HOF, notation and terminology used herein is first established. During training, an image I of an object O as well as $X^*=\{x_1^*, \ldots, x_n^*\}$, a set of points sampled from O, are given. A close approximation of the ground truth geodesic function between two samples can be computed, which may be denoted as $g(\bullet, \bullet)$. Using a convolutional neural network, Geodesic-HOF maps an input image I to a continuous mapping function $f_I: M \subset \mathbb{R}^D \to \mathbb{R}^{3+K}$ from a canonical sampling domain M to an embedding space $Z=\{z_i=f_I(m_i)\in \mathbb{R}^{3+K}\}$ One embodiment takes M to be the unit solid sphere.

For every $z \in Z$, the vector obtained by taking the first three components of z is denoted as x and referred to as point coordinates of z. The remaining K dimensions is referred to as the geodesic lifting coordinates of z. $\hat{O}=\{\hat{x}_i=f_I(m_i)\}$ is defined as a set of predicted point coordinates from a set of samples $\{m_i\}$. Finally, for any two $m_i, m_j \in M$, with $\hat{z}_i=f_I(m_i)$ and $\hat{z}_j=f_I(m_j)$, let $\hat{g}(\hat{z}_i, \hat{z}_j)=\|\hat{z}_i-\hat{z}_j\|_2$.

The mapping $f_I$ is trained such that $\hat{O}$ accurately approximates the ground truth object O in terms of Chamfer distance, and $\hat{g}(z_i,z_j)$ accurately approximates the ground truth geodesic distance $g(x_1^*, x_j^*)$, where $x_1^*, x_j^* \in X^*$ are the two ground truth samples closest to $\hat{x}_i, \hat{x}_j$.

The first condition requires that the point coordinates represent an accurate sampling of the object surface; the second condition requires the embedding space to accurately capture geodesic distances between two point coordinates. The lifting coordinates encode curvature information: the quantity $\hat{g}(\hat{z}_i,\hat{z}_j)^2-\|\hat{x}_i-\hat{x}_j\|^2$ is equal to the squared norm of the geodesic lifting coordinates. This quantity approaches the geodesic curvature when the samples are close to each other on the manifold.

Figure 2:
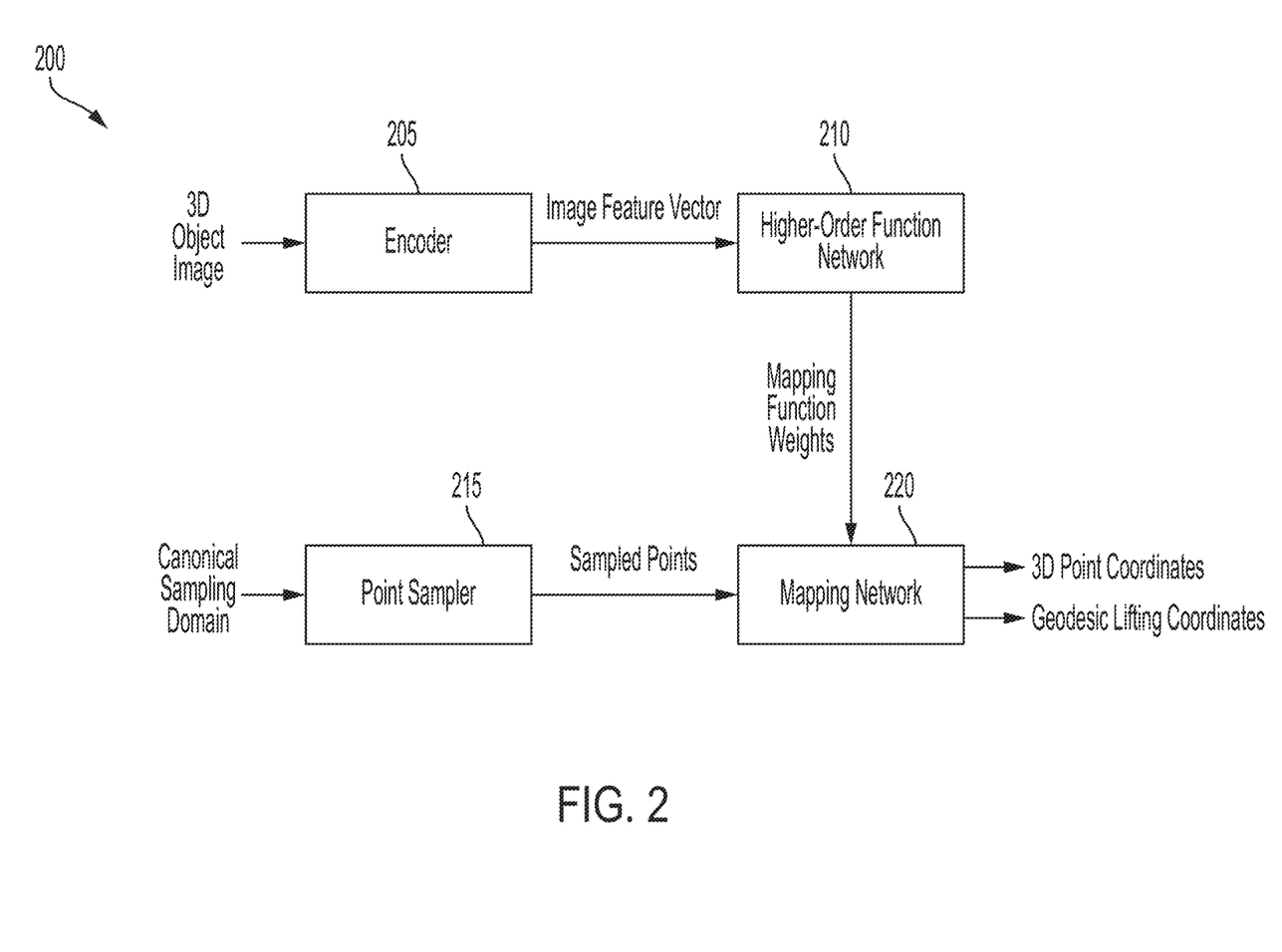
FIG. 2 is a block diagram of an apparatus for 3D object and surface reconstruction, according to embodiments.

FIG. 2 is a diagram of an apparatus 200 for 3D object and surface reconstruction, according to embodiments.

As shown in FIG. 2, the apparatus 200 includes an encoder 205, a higher-order function network 210, a point sampler 215 and a mapping network 220.

The encoder 205 obtains a single 2D image of a 3D object (or a 3D object image), and obtains an image feature vector corresponding to the obtained 3D object image. In detail, the encoder 205 extracts, from the 3D object image, semantic and geometric information to obtain the image feature vector.

The 2D image may be a single-view RGB image including the 3D object or a portion of the 3D object. The 2D image may be obtained from a data storage medium including a magnetic medium such as a hard disk, a floppy disk, or a magnetic tape, an optical recording medium such as CD-ROM or DVD, or a magneto-optical medium such as a floptical disk. The 2D image may also be obtained from a camera and obtained via a processor (e.g., a processor 910 of FIG. 9). The image feature vector may be a 512-dimensional image feature vector. The encoder 205 may include a convolutional neural network (CNN) without using any pre-trained weights.

The higher-order function network 210 obtains the image feature vector, and obtains mapping function weights of a mapping function of the mapping network 220, based on the obtained image feature vector. In detail, the higher-order function network 210 predicts a set of the mapping function weights $\theta$ of the mapping function $f_I: \mathbb{R}^D \to \mathbb{R}^{3+K}$.

The higher-order function network 210 may be a pre-trained deep neural network (DNN) or CNN for mapping an image feature vector into mapping function weights. The mapping function weights are to be used to set the mapping network 220 that may be a pre-trained DNN or CNN representing a mapping function or higher-order function for mapping 3D sampled points of a 3D canonical sampling domain into point coordinates of a 3D object. The higher-order function network 210 and the mapping network 220 may be pre-trained together and in connection with each other, at the same time.

A processor (e.g., a processor 910 of FIG. 9) obtains the mapping function weights from the higher-order function network 210, and sets the mapping function of the mapping network 220, using the obtained mapping function weights.

The point sampler 215 samples points of a 3D canonical sampling domain. In detail, the point sampler 215 samples the 3D canonical sampling domain in $\mathbb{R}^D$ to obtain a set of the points $M=\{m_i \in \mathbb{R}^D\}$. For example, a value D may be 3.

The sampled points may be of a surface or interior of any predetermined 3D canonical sampling domain or space, for example, a unit sphere and a unit cube, e.g., a 512-dimensional unit hypercube. The 3D canonical sampling domain may be obtained from a data storage medium including a magnetic medium such as a hard disk, a floppy disk, or a magnetic tape, an optical recording medium such as CD-ROM or DVD, or a magneto-optical medium such as a floptical disk. The 3D canonical sampling domain may also be obtained via the processor.

Based on the mapping function of mapping network 220 being set, the mapping network 220 obtains the sampled points, and obtains 3D point coordinates of an embedding space corresponding to the 2D image, based on the obtained sampled points. The embedding space may be a 3D representation (e.g., a surface or interior) of the original 3D object included in the 2D image, even if the 2D image includes only the portion of the original 3D object.

Based on the mapping function of mapping network 220 being set, the mapping network 220 further obtains geodesic lifting coordinates of the embedding space corresponding to the 2D image, based on the obtained sampled points.

In detail, the mapping network 220 maps the sampled points to a set of the 3D point coordinates or embeddings $Z=\{z_i=f_I(m_i) \in \mathbb{R}^{3+K}\}$. The embedding space may be a 3+K embedding space or vector. First three dimensions of the embedding space are called the 3D point coordinates $x_i$, which represent true 3D locations of the sampled points in an object space. On the other hand, next K dimensions are called geodesic lifting coordinates $w_i$.

As opposed to Latent Vector Concatenation (LVC) methods, the embodiments are able to avoid a fixed-size global object feature appended to points by directly computing weights of a mapping network. Additionally, the embodiments provide a more direct gradient path into an image encoder, e.g., the encoder 205.

The apparatus 200 and any portion of the apparatus 200 may be included or implemented in a client device and/or a server device. The client device may include any type of electronic device, for example, a smartphone, a laptop computer, a personal computer (PC), a smart television and the like.

Figure 3:
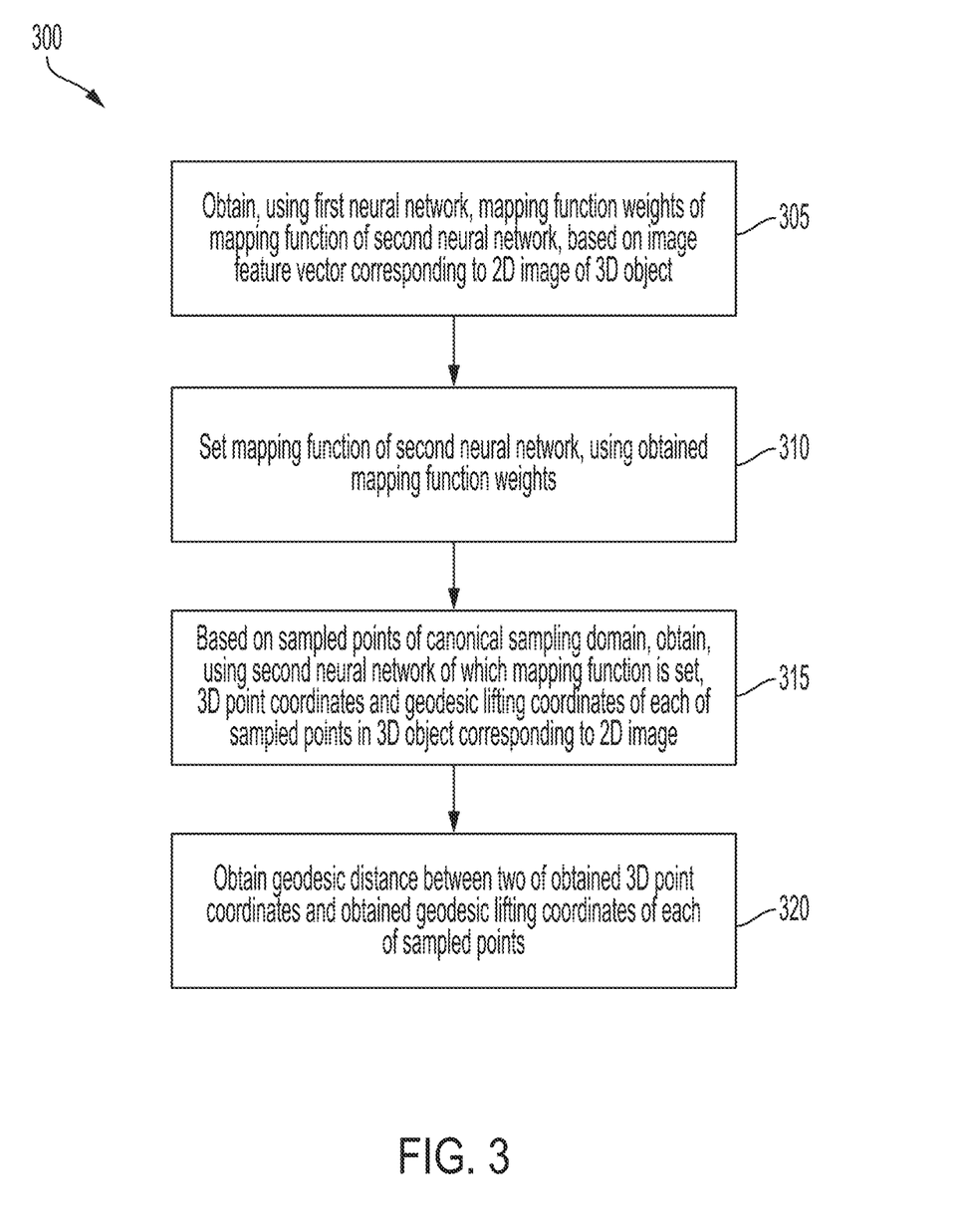
FIG. 3 is a flowchart of a method of 3D object and surface reconstruction, according to embodiments.

FIG. 3 is a flowchart of a method 300 of 3D object and surface reconstruction, according to embodiments.

The method 300 may be performed by at least one processor using the apparatus 200 for 3D object and surface reconstruction of FIG. 2.

Referring to FIG. 3, in operation 305, the method 300 includes obtaining, using a first neural network, mapping function weights of a mapping function of a second neural network, based on an image feature vector corresponding to a two-dimensional (2D) image of the 3D object.

In operation 310, the method 300 includes setting the mapping function of the second neural network, using the obtained mapping function weights.

In operation 315, the method 300 includes, based on sampled points of a canonical sampling domain, obtaining, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector.

In operation 320, the method 300 includes obtaining a geodesic distance between two of the obtained 3D point coordinates and the obtained geodesic lifting coordinates of each of the sampled points.

The 3D samples may be of a surface or an interior of the canonical sampling domain, and the canonical sampling domain may be a unit sphere or a unit cube.

The 3D point coordinates may correspond to a surface or an interior of the 3D object included in the 2D image.

The first neural network may be trained to obtain the mapping function weights, based on the image feature vector, in connection with the second neural network that is trained to obtain the 3D point coordinates the geodesic lifting coordinates, based on the sampled points.

The method 300 may be performed by a client device comprising the second neural network, and the first neural network may be included in a server device external to the client device.

The method 300 may further include obtaining the image feature vector corresponding to the 2D image, using a third neural network.

The method 300 may further include sampling the canonical sampling domain to obtain the sampled points.

Figure 4:
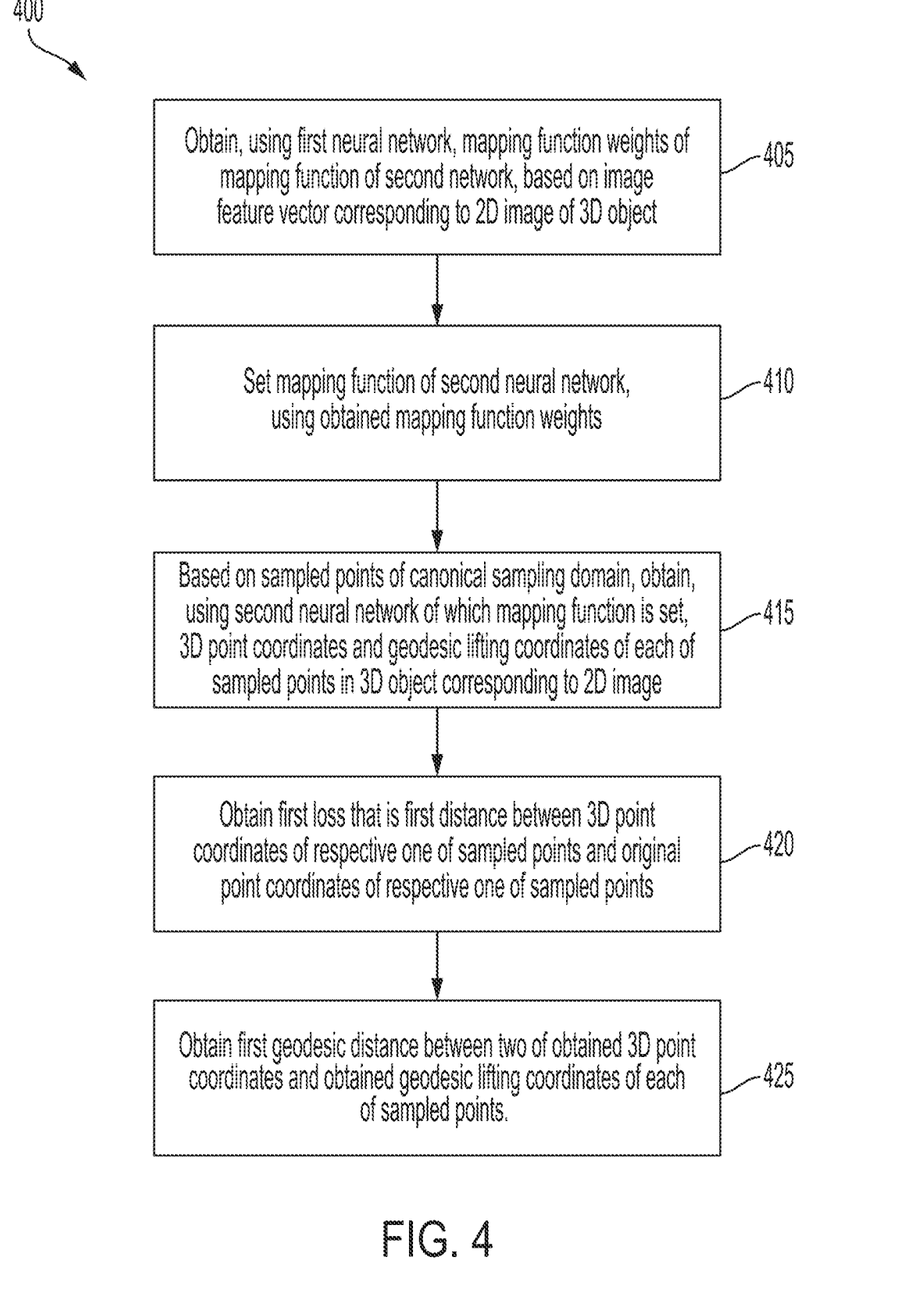
FIG. 4 is a flowchart of a method of training for 3D object and surface reconstruction, according to embodiments.

FIG. 4 is a flowchart of a method 400 of training for 3D object and surface reconstruction, according to embodiments.

The method 400 may be performed by at least one processor training the apparatus 200 for 3D object and surface reconstruction of FIG. 2.

Referring to FIG. 4, in operation 405, the method 400 includes obtaining, using a first neural network, mapping function weights of a mapping function of a second neural network, based on an image feature vector corresponding to a two-dimensional (2D) image of the 3D object.

In operation 410, the method 400 includes setting the mapping function of the second neural network, using the obtained mapping function weights.

In operation 415, the method 400 includes, based on sampled points of a canonical sampling domain, obtaining, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector.

In operation 420, the method 400 includes obtaining a first loss that is a first distance between the 3D point coordinates of a respective one of the sampled points and original point coordinates of the respective one of the sampled points.

In operation 425, the method 400 includes obtaining a first geodesic distance between two of the obtained 3D point coordinates and the obtained geodesic lifting coordinates of each of the sampled points.

The method 400 may further include obtaining a second loss that is a second distance between the first geodesic distance and a second geodesic distance between two of the sampled points corresponding to the two of the obtained 3D point coordinates and the obtained geodesic lifting coordinates of each of the sampled points.

The method 400 may further include updating the parameters of the first neural network and the second neural network to minimize the obtained first loss and the obtained second loss.

In detail, weights of a mapping function $f_I$ are learned to minimize two losses: a Chamfer loss and a geodesic loss. Let $M \in \mathbb{R}^D$ be a set of points randomly sampled from a k-dimensional pre-mapping space. An image of X for a given image I is given by $Z=\{z_i=f_I(m_i)|m_i \in M\}$. For simplicity of notation, 3D point coordinates $X=\{x_i \in \mathbb{R}^3\}$ and geodesic lifting coordinates $W=\{w_i \in \mathbb{R}^K\}$ such that $z_i$: $\{x_i; w_i\}$ are separated.

Chamfer loss is defined as a set distance between a mapped point set X and a ground truth point set Y.

$$L_{Chamfer}(X, Y) = \frac{1}{|X|} \sum_{x \in X} \min_{y \in Y} \|x - y\|_2^2 + \frac{1}{|Y|} \sum_{y \in Y} \min_{x \in X} \|y - x\|_2^2 \quad (1)$$

Here, the loss is optimized to make sure that a predicted point cloud approaches a ground truth object shape.

Geodesic loss enforces the consistency between an Euclidean distance in a postmapping domain and a geodesic distance in the reconstruction domain. The ground truth geodesic distance is denoted on an object surface as $g_O(x_a, x_b)$, where $(p_a, p_b) \in O$ and O is a union of several 2-manifolds representing the object surface in $\mathbb{R}^3$. Since the geodesic distance is only defined on the object surface, points $\{x_i\}$ are projected onto an object and the pair-wise geodesic distance is computed. The details of this formulation is described in Equation (6). In an effort to reconstruct the object while learning an embedding of each point so that the geodesic distance in the 3D object space $\mathbb{R}^3$ is the same as the Euclidean distance in the embedding space $\mathbb{R}^k$. For a set of embeddings $Z=\{z_i:=[x_i, w_i]\}$, the geodesic loss is defined as:

$$L_{geo}(Z) = \frac{1}{|Z|^2} \sum_{i=1}^{|Z|} \sum_{j=1}^{|Z|} (\|z_i - z_j\|_2 - g_o(x_i, x_j))^2 \quad (2)$$

For computing the geodesic loss, a ground truth geodesic distance matrix is needed on an object O. This is obtained by sampling O and building a nearest neighborhood graph $G_O=(V_O, A_O)$ on samples. $D_O(v_i, v_j)$ is defined as a length of the shortest path between $v_i \in V_O$ and $v_j \in V_O$ computed by Dijkstra's algorithm on $G_O$. For each point $x_i$ from the prediction, each point to the K nearest neighbors is found and denoted as $\Lambda(x_i)=\{v_i^p\}$. For a pair of point $(x_i, x_j)$, it is assumed that a set of nearest neighbors in V of $x_i$ and $x_j$ are $\Lambda(x_i)=\{v_i^p\}$ and $\Lambda(x_j)=\{v_j^q\}$. $\alpha_{ij}$ is defined as a confidence of an undirected path between $v_i \in V$ and $v_j \in V$, as:

$$\alpha_{pq}(x_i, x_j) = \frac{\gamma_{pq}(x_i, x_j)}{\sum_{p \in |\Lambda(x_i)|, q \in |\Lambda(x_j)|} \gamma_{pq}(x_i, x_j)} \quad (3)$$

$$\gamma_{pq}(x_i, x_j) = \sigma(x_i, v_i^p)\sigma(x_j, v_j^q) \quad (4)$$

$$= \exp(-(\|x_i - v_i^p\|_2^2 + \|x_j - v_j^q\|_2^2)) \quad (5)$$

The confidence of a path between $x_i$ and $x_j$ going through two vertices $v_i^a$ and $v_j^b$ is a normalized similarity between $(x_i, x_j)$ from the prediction and their possible corresponding vertices $(v_i^a, v_j^b)$ in the graph, where the similarity is measured by a radial basis kernel. Since things are normalized across different paths, $\sum_{i \in |\Lambda(x_i)|, j \in |\Lambda(x_j)|} \alpha_{pq}(x_i, x_j)$ is ensured to be 1 so that the confidence for all possible paths can be seen as a probability distribution over which vertices $(v_i^p, v_j^q)$ are to be chosen on the ground truth object. Thus, a soft goedesic loss function can be defined as:

$$g_O(x_i, x_j) = \sum_{v_i^p \in |\Lambda(x_i)|, v_j^q \in |\Lambda(x_j)|} \alpha_{pq}(x_i, x_j) D_O(v_i^p, v_j^q) \quad (6)$$

The two loss terms are jointly optimized by their weighted sum with weights $\lambda_{geo}$ and $\lambda_{chamfer}$:

$$L := \lambda_{Chamfer} L_{Chamfer} + \lambda_{geo} L_{geo} \quad (7)$$

Since a convergence of a point prediction network is important for finding a correct geodesic distance, a Chamfer loss may be weighted more than a geodesic loss. In an embodiment, $\lambda_{geo}$ and $\lambda_{Chamfer}$ are chosen to be 0.1 and 1.0 separately. Experiments show that this combination produces both better Chamfer and geodesic performance than evenly weighing the two loss terms.

Experiments further show that geodesic-HOF can accurately represent an object by the best overall chamfer performance. By learning a continuous mapping function between a mapping domain and an embedding domain, high-resolution sampling of the embedding space to represent the object is allowed. In addition, by using a higher-order function network as a decoder, one can avoid dimensionality constraints of latent vector code to provide a more direct way for image information to be more effectively learned by a mapping function. In comparison, methods that have pre-defined connectivity suffer from topological constraints of a sampling domain.

Experiments further show that the geodesic neighborhood embeddings provide a better guide for finding a low curvature neighborhood than other methods. For example, on an edge of a table, if estimating a normal of points on a tabletop near the edge, one should avoid an inclusion of points on a side. The geodesic neighborhoods yield overall better normal estimation results. This shows the effectiveness of the learned geodesics in understanding the local structure, such as curvature, of the object.

Figure 5A:
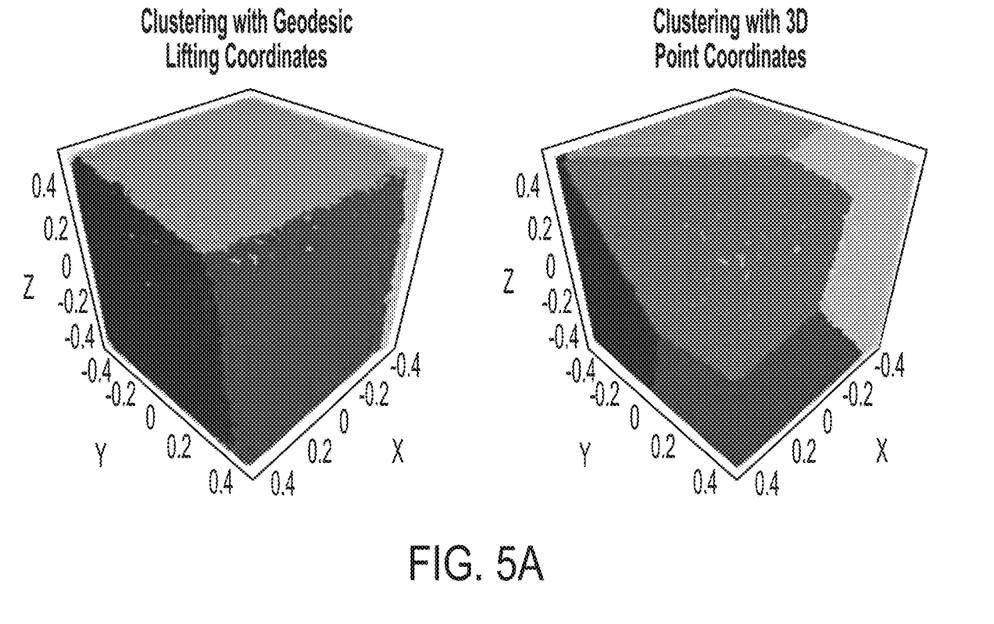
FIGS. 5A and 5B are diagrams of a manifold decomposition of a canonical cube shape, and a manifold decomposition of a table from a test set.
Figure 5B:
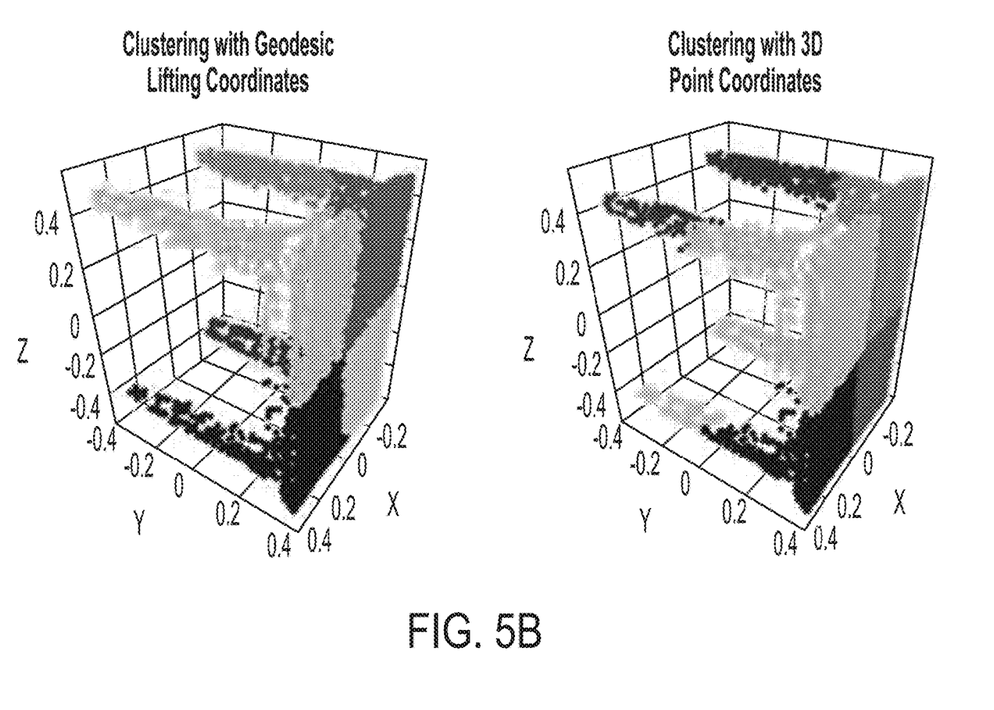

FIGS. 5A and 5B are diagrams of a manifold decomposition of a canonical cube shape, and a manifold decomposition of a table from a test set.

Referring to FIGS. 5A and 5B, surface manifold decompositions by clustering raw 3D points coordinates $x_i$ and geodesic lifting coordinates $w_i$ of predicted embedding $z_i = [x_i, w_i]$ are compared. K-Means is used for clustering with K=6, in an embodiment. Geodesic lifting coordinates provide more meaningful features that partition a surface into intuitive components.

In detail, the object surface can be represented as a differentiable 2-manifold, also known as an atlas, using a collection of charts. Clustering geodesic-HOF embeddings according to the lifting coordinates provides a natural way to split the object into a small number of low curvature charts as illustrated in FIGS. 5A and 5B in which this technique is contrasted with a standard clustering method based on a Euclidean distance in $\mathbb{R}^3$. An embodiment correctly separates the faces of the cube on the left, the legs and the table-top on the right.

The charts can be useful in many applications such as establishing a uv-map for texture mapping and for triangulation based mesh generation.

Figure 6A:
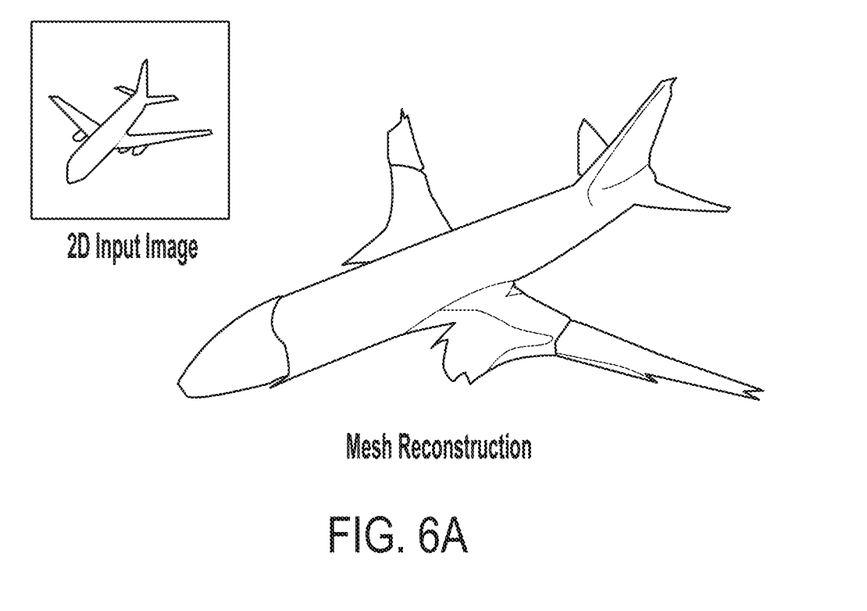
FIGS. 6A and 6B are diagrams of a mesh reconstruction by fitting a chart onto each non-overlapping manifold from clustering geodesic lifting coordinates, and a visualization of different manifolds from a decomposition by clustering geodesic lifting coordinates.
Figure 6B:
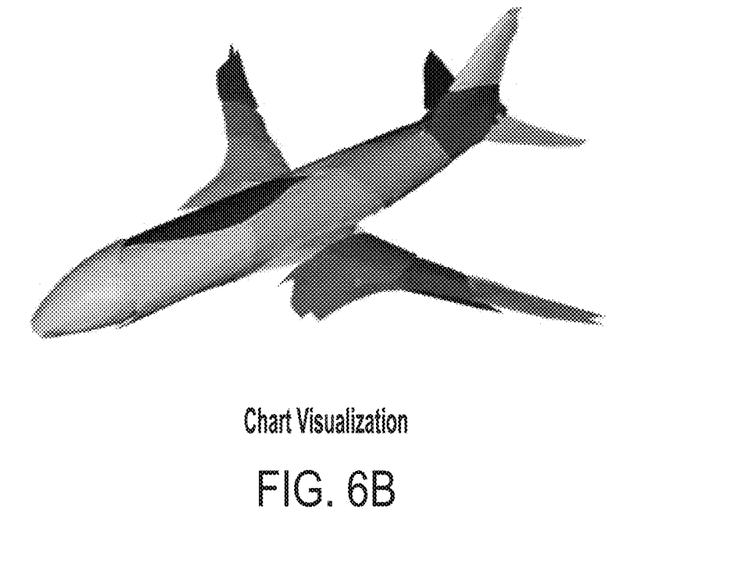

FIGS. 6A and 6B are diagrams of a mesh reconstruction by fitting a chart onto each non-overlapping manifold from clustering geodesic lifting coordinates, and a visualization of different manifolds from a decomposition by clustering geodesic lifting coordinates.

Once the object is decomposed into charts, it can fit a surface to each chart and establish a two-dimensional coordinate frame. The 2D coordinates can then be used for triangulation. One possible approach is to fit a parametric representation to each chart such as plane or a conic. An approach may use a multilayer perceptron $f_\theta$ to represent the manifold. One of the advantages of Geodesic-HOF is that since low-curvature regions already partitioned into charts and have point coordinates associated with each chart, the parameters $\theta$ can be learned in an unsupervised manner. FIGS. 6A and 6B illustrate this method.

In order to reconstruct the object surface from our predicted embedding $Z = \{z_i \in \mathbb{R}^{3+K}\}$, a mapping from a canonical chart to the object is optimized. For each decomposed manifold, a mapping from a canonical chart to this manifold is learned. More specifically, given a set of samples $U_i = \{(u,v) \in \mathbb{R}^2\}$ from a canonical 2D chart and a set of samples from target manifold $M_i$, the mapping function $f: \mathbb{R}^2 \rightarrow \mathbb{R}^3$ is learned so as to minimize the Chamfer distance between $U_i$ and $M_i$. An embodiment decomposes the object surface into 20 local manifold, so $M \cup_{i=1}^{20} M_i$. Since clustering is used for decomposing the object, an embodiment can ensure the absence of overlapping areas between the manifolds. In other words, $\cup_{i=1}^{20} M_i = \emptyset$. The mesh is not optimized with respect to the ground truth. The optimization is with respect to our own prediction. There is zero to little overlap between the charts since geodesic clustering is used for all points. The decomposition with the geodesic lifting dimensions simplifies the manifold learning problem into learning the mapping to a set of low-curvature manifolds. Rather than designing a new mesh learning method, an embodiment shows that a surface can be easily extracted from an embedding representation and that competitive mesh results can be achieved. It is possible to extend this to a fully end-to-end mesh reconstruction algorithm to directly supervise the network with the ground truth training set.

In FIGS. 6A and 6B, an airplane is decomposed to 20 non-overlapping charts by clustering the lifting coordinates, and triangulating each chart using the method described above. It can be seen that the charts are split nicely at high-curvature areas.

In an embodiment, the manifold decomposition into the training pipeline is not added to mesh generation method, but rather post-optimizes the output of Geodesic-HOF. Therefore, the mesh reconstruction module is not optimized using ground truth. Yet, it still achieves reasonably good performance in both chamfer and normal consistency while ensuring the non-overlapping nature of the prediction.

Figure 7A:
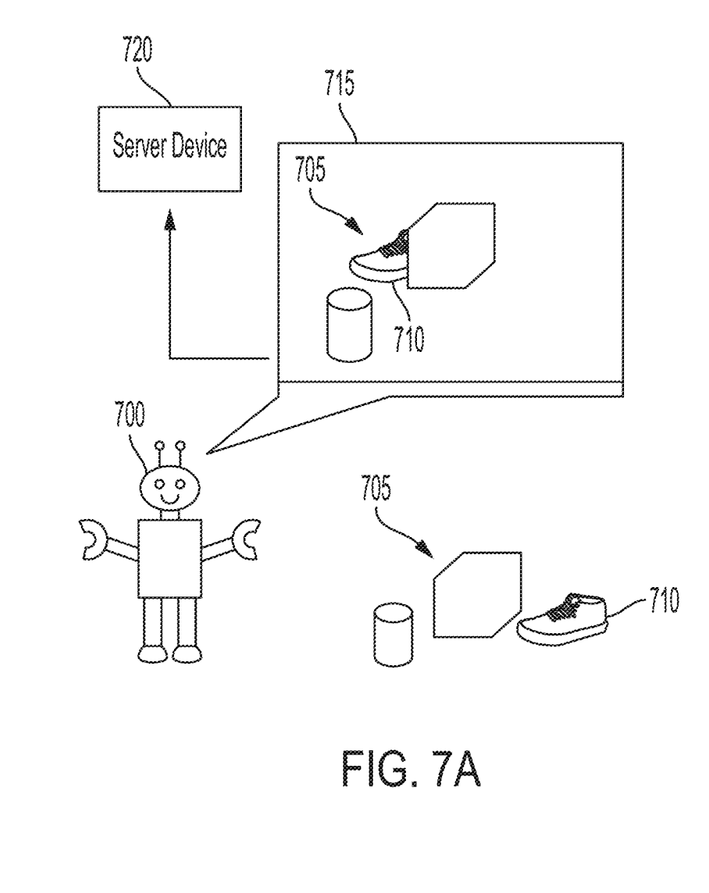
FIGS. 7A and 7B are diagrams of a use case of the apparatus shown in FIG. 2, in which a robot implements a portion of the apparatus.
Figure 7B:
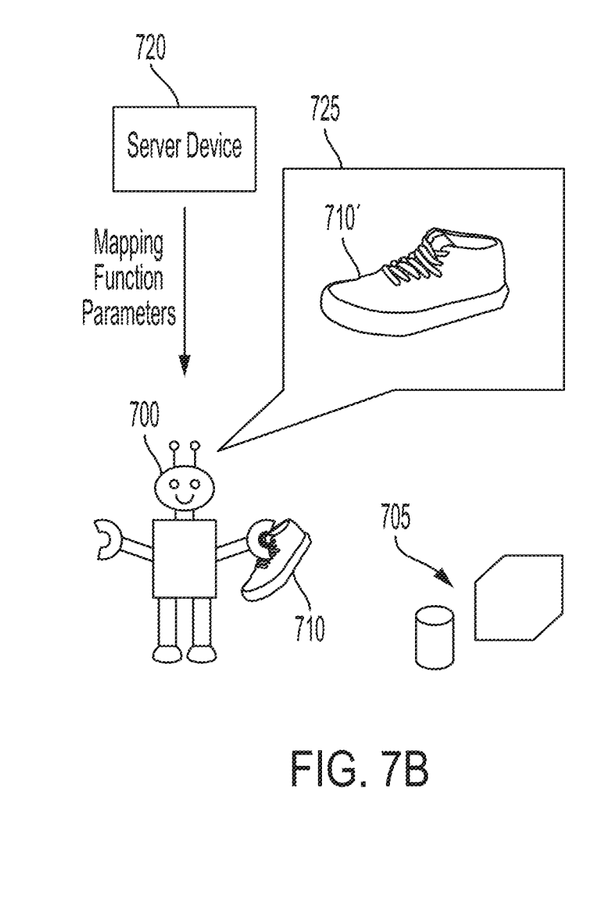

FIGS. 7A and 7B are diagrams of a use case of the apparatus 200 shown in FIG. 2, in which a robot 700 implements a portion of the apparatus 200.

As shown in FIG. 7A, the robot 700 implementing the portion of the apparatus 200 is near a plurality of objects 705 including a shoe 710, and wants to pick up the shoe 710 with its arm and hand. The robot 700 includes a camera that obtains a 2D image 715 of the plurality of objects 705, in which the shoe 710 is partially blocked by at least one of the plurality of objects 705.

To accurately pick up the shoe 710, the robot 700 may need a 3D model of the shoe 710 that is not partially blocked by any of the plurality of objects 705. With such a 3D model, the robot 700 may rotate the 3D model to learn the best location to pick up the shoe 710. Accordingly, the robot 700 sends the obtained 2D image to a server device 720 implementing another portion of the apparatus 200.

In FIG. 7B, based on the 2D image being sent, the robot 700 receives mapping function parameters from the server device 720, and sets a mapping function of a neural network (the mapping network 220 of FIG. 2) included in the robot 700, using the obtained mapping function parameters. Based on the mapping function of the neural network being set, the robot obtains a 3D object 710' corresponding to the shoe 710 in a view 725, which can be used to accurately pick up the shoe 710 among the plurality of objects 705 as shown in FIG. 7B.

Figure 8A:
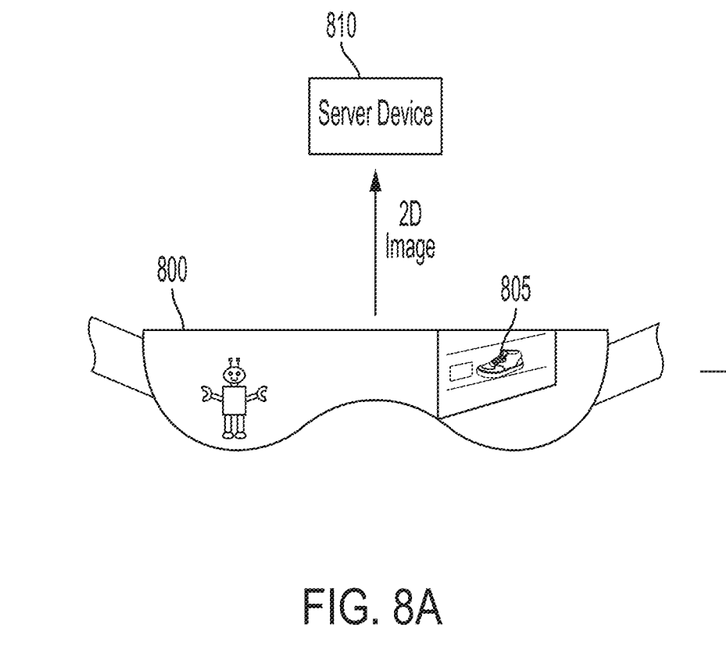
FIGS. 8A and 8B are diagrams of a use case of the apparatus shown in FIG. 2, in which AR glasses implement a portion of the apparatus 200.
Figure 8B:
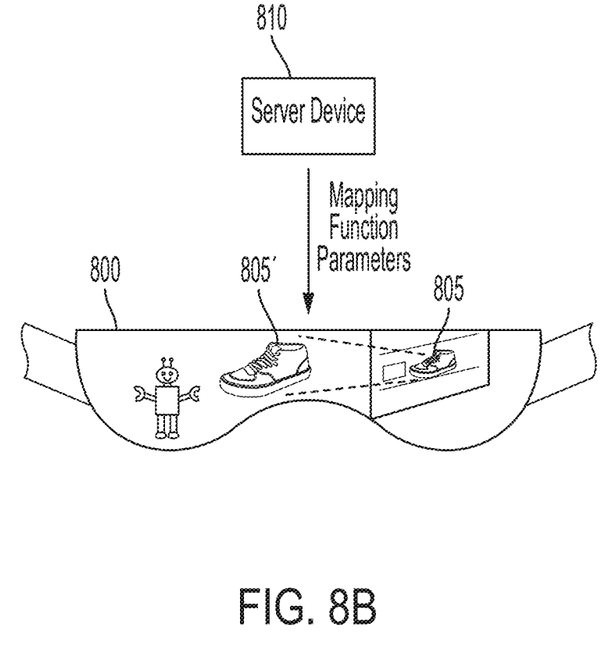

FIGS. 8A and 8B are diagrams of a use case of the apparatus 200 shown in FIG. 2, in which AR glasses 800 implement a portion of the apparatus 200.

As shown in FIG. 8A, a user wearing the AR glasses 800 implementing the portion of the apparatus 200 may be in a store shopping for a shoe 805, see the shoe 805 on a store shelf through the AR glasses 800, and want to learn more about the shoe 805. The AR glasses 800 includes a camera that obtains a 2D image of the store and the shoe 805. To learn more about the shoe 805, the AR glasses 800 sends the obtained 2D image to a server device 1010.

In FIG. 8B, based on the 2D image being sent, the AR glasses 800 receives mapping function parameters from the server device 1010, and sets a mapping function of a neural network (the mapping network 220 of FIG. 2) included in the AR glasses 800, using the obtained mapping function parameters. Based on the mapping function of the neural network being set, the AR glasses 800 obtains and displays a 3D object 805' corresponding to the shoe 805 in an AR environment of the store. The 3D object 805' can be used to learn more about shoe 805. For example, the user wearing the AR glasses 800 may instruct the AR glasses 800 to rotate and inspect the 3D object 805', without interacting with the real-life shoe 805.

Figure 9:
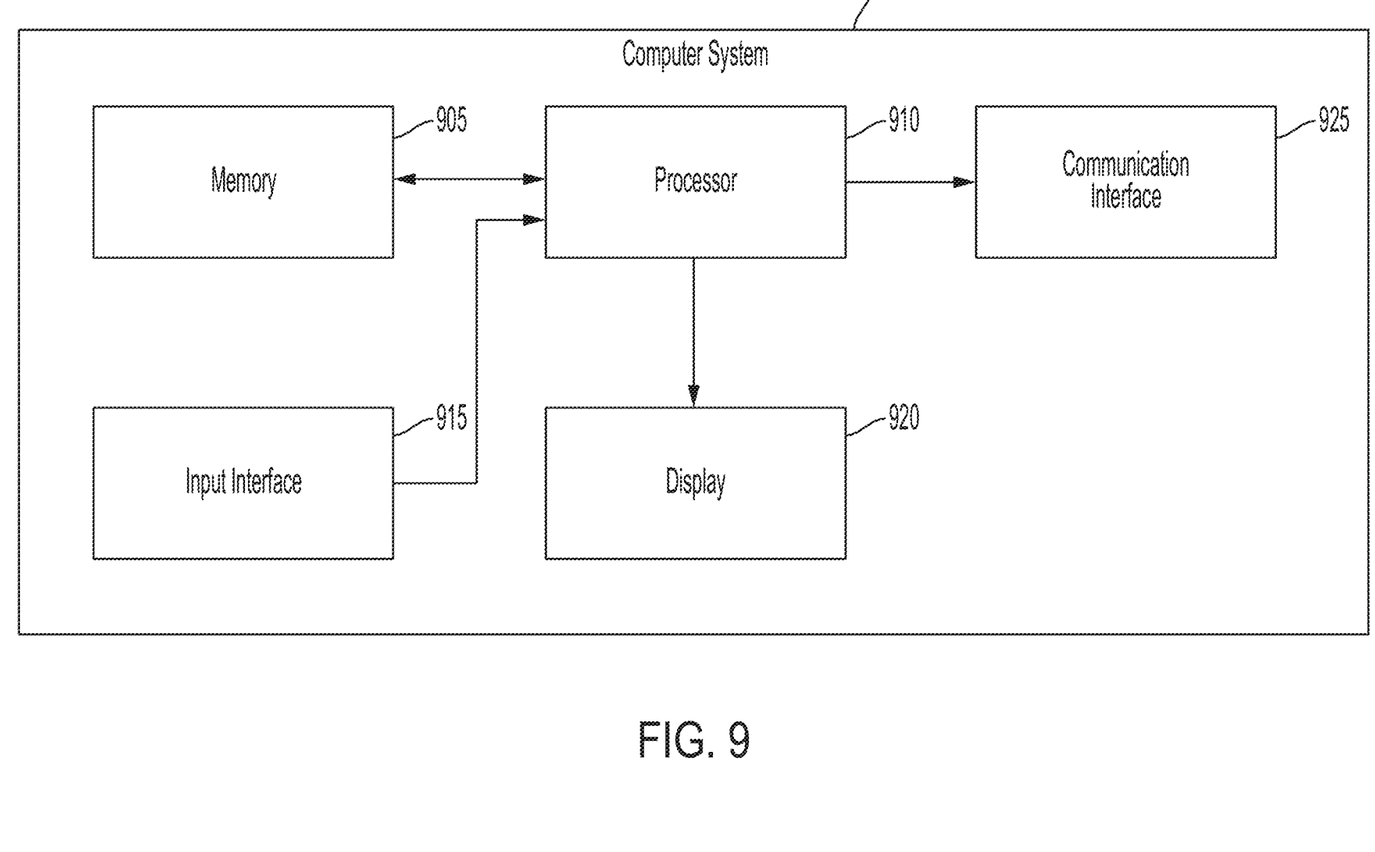
FIG. 9 is a block diagram of an electronic device 900 implementing an apparatus for representing a 3D object, according to embodiments.

FIG. 9 is a block diagram of an electronic device 900 implementing an apparatus for representing a 3D object, according to embodiments.

Referring to FIG. 9, the electronic device 900 includes a memory 905, a processor 910, an input interface 915, a display 920 and a communication interface 925. The electronic device 900 may be implemented in the apparatus 200 shown in FIG. 2, respectively.

The processor 910 takes overall control of the electronic device 900. The processor 910 executes one or more programs stored in the memory 905.

The memory 905 stores various data, programs, or applications for driving and controlling the electronic device 900. A program stored in the memory 905 includes one or more instructions. A program (one or more instructions) or an application stored in the memory 905 may be executed by the processor 910.

The processor 910 may perform any one or any combination of operations of the apparatus 200 shown in FIG. 2.

The input interface 915 may receive a user input and/or a data such as a 2D image. The input interface 915 may include, for example, a touchscreen, a camera, a microphone, a keyboard, a mouse or any combination thereof.

The display 920 may obtain data from, e.g., the processor 910, and may display the obtained data. The display 920 may include, for example, a touchscreen, a television, a computer monitor and the like.

The communication interface 925 transmits and receives data to and from other electronic devices, and may include one or more components causing communication to be performed via a local area network (LAN), a wide area network (WAN), a value added network (VAN), a mobile radio communication network, a satellite communication network, or a combination thereof.

The block diagram of the electronic device 900 is provided as an example. Each component in the block diagram may be integrated, added, or omitted depending upon specifications of the electronic device 900 that is actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN or CNN described above may be implemented via a software module. When the DNN or CNN model is implemented via a software module (for example, a program module including instructions), the DNN or CNN model may be stored in a computer-readable recording medium.

Also, the DNN or CNN model may be a part of the apparatus 200 described above by being integrated in a form of a hardware chip. For example, the DNN or CNN model may be manufactured in a form of a dedicated hardware chip for AI, or may be manufactured as a part of an existing general-purpose processor (for example, CPU or application processor) or a graphic-dedicated processor (for example GPU).

Also, the DNN or CNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for reconstructing a three-dimensional (3D) object, the apparatus comprising:
 a memory storing instructions; and
 at least one processor configured to execute the instructions to:
  obtain, using a first neural network, mapping function weights of a mapping function of a second neural network, based on an image feature vector corresponding to a two-dimensional (2D) image of the 3D object;
  set the mapping function of the second neural network, using the obtained mapping function weights; and
  based on sampled points of a canonical sampling domain, obtain, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector.

2. The apparatus of claim 1, wherein the at least one processor is further configured to execute the instructions to obtain a geodesic distance between two of the obtained 3D point coordinates and the obtained geodesic lifting coordinates of each of the sampled points.

3. The apparatus of claim 1, wherein the 3D samples are of a surface or an interior of the canonical sampling domain, and the canonical sampling domain is a unit sphere or a unit cube.

4. The apparatus of claim 1, wherein the 3D point coordinates correspond to a surface or an interior of the 3D object included in the 2D image.

5. The apparatus of claim 1, wherein the first neural network is trained to obtain the mapping function weights, based on the image feature vector, in connection with the second neural network that is trained to obtain the 3D point coordinates the geodesic lifting coordinates, based on the sampled points.

6. The apparatus of claim 1, wherein the apparatus is a client device comprising the second neural network, and the first neural network is included in a server device external to the client device.

7. The apparatus of claim 1, wherein the at least one processor is further configured to obtain the image feature vector corresponding to the 2D image, using a third neural network.

8. The apparatus of claim 1, wherein the at least processor is further configured to sample the canonical sampling domain to obtain the sampled points.

9. A method of reconstructing a three-dimensional (3D) object, the method comprising:

obtaining, using a first neural network, mapping function weights of a mapping function of a second neural network, based on an image feature vector corresponding to a two-dimensional (2D) image of the 3D object;

setting the mapping function of the second neural network, using the obtained mapping function weights; and based on sampled points of a canonical sampling domain, obtaining, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector.

10. The method of claim 9, further comprising obtaining a geodesic distance between two of the obtained 3D point coordinates and the obtained geodesic lifting coordinates of each of the sampled points.

11. The method of claim 9, wherein the 3D samples are of a surface or an interior of the canonical sampling domain, and the canonical sampling domain is a unit sphere or a unit cube.

12. The method of claim 9, wherein the 3D point coordinates correspond to a surface or an interior of the 3D object included in the 2D image.

13. The method of claim 9, wherein the first neural network is trained to obtain the mapping function weights, based on the image feature vector, in connection with the second neural network that is trained to obtain the 3D point coordinates the geodesic lifting coordinates, based on the sampled points.

14. The method of claim 9, wherein the method is performed by a client device comprising the second neural network, and the first neural network is included in a server device external to the client device.

15. The method of claim 9, further comprising obtaining the image feature vector corresponding to the 2D image, using a third neural network.

16. The method of claim 9, further comprising sampling the canonical sampling domain to obtain the sampled points.

17. A non-transitory computer-readable storage medium storing instructions that, when executed by at least one processor, cause the at least one processor to perform the method of claim 9.

18. A training method for reconstructing a three-dimensional (3D) object, the training method comprising:

obtaining, using a first neural network, mapping function weights of a mapping function of a second neural network, based on an image feature vector corresponding to a two-dimensional (2D) image of the 3D object;

setting the mapping function of the second neural network, using the obtained mapping function weights;

based on sampled points of a canonical sampling domain, obtaining, using the second neural network of which the mapping function is set, 3D point coordinates and geodesic lifting coordinates of each of the sampled points in the 3D object corresponding to the 2D image, wherein the 3D point coordinates are first three dimensions of an embedding vector of a respective one of the sampled points, and the geodesic lifting coordinates are remaining dimensions of the embedding vector;

obtaining a first loss that is a first distance between the 3D point coordinates of a respective one of the sampled points and original point coordinates of the respective one of the sampled points; and updating parameters of the first neural network and the second neural network to minimize the obtained first loss.

19. The training method of claim 18, further comprising:

obtaining a first geodesic distance between two of the obtained 3D point coordinates and the obtained geodesic lifting coordinates of each of the sampled points; and obtaining a second loss that is a second distance between the first geodesic distance and a second geodesic distance between two of the sampled points corresponding to the two of the obtained 3D point coordinates and the obtained geodesic lifting coordinates of each of the sampled points, wherein the updating comprises updating the parameters of the first neural network and the second neural network to minimize the obtained first loss and the obtained second loss.

20. A non-transitory computer-readable storage medium storing instructions that, when executed by at least one processor, cause the at least one processor to perform the training method of claim 18.

* * * * *